UNITED STATES PATENT OFFICE.

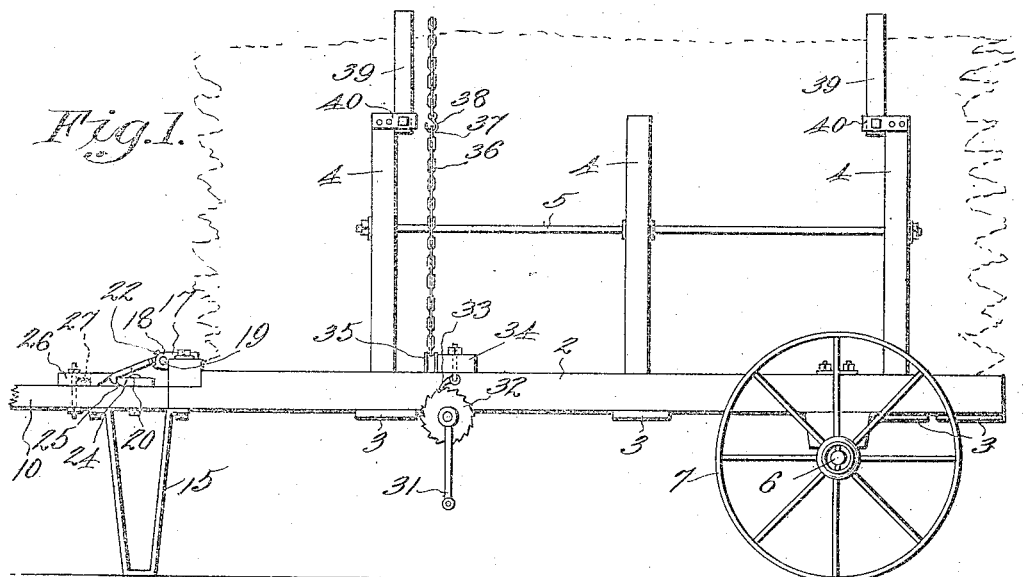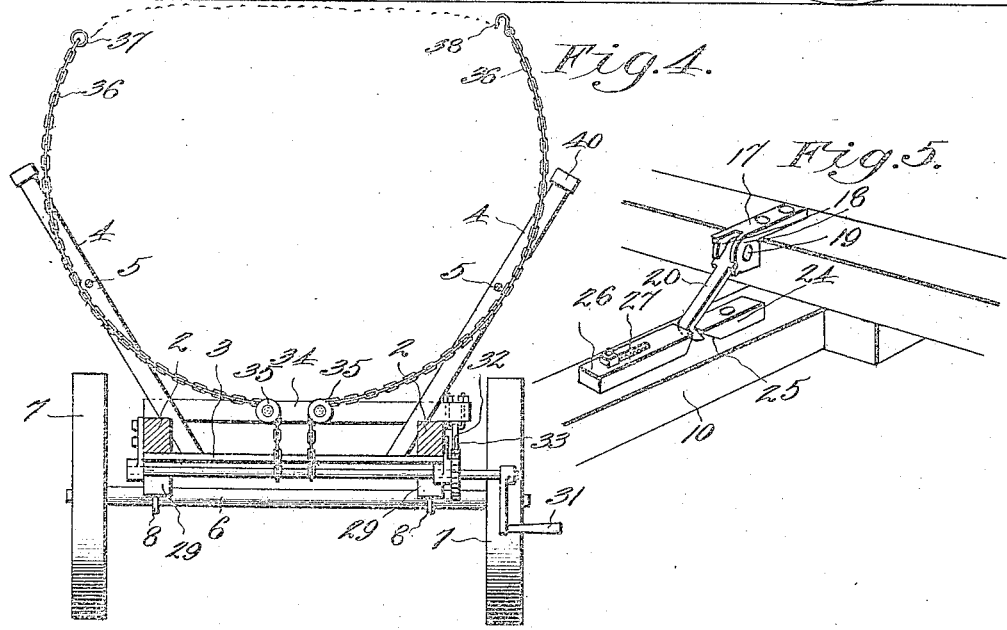

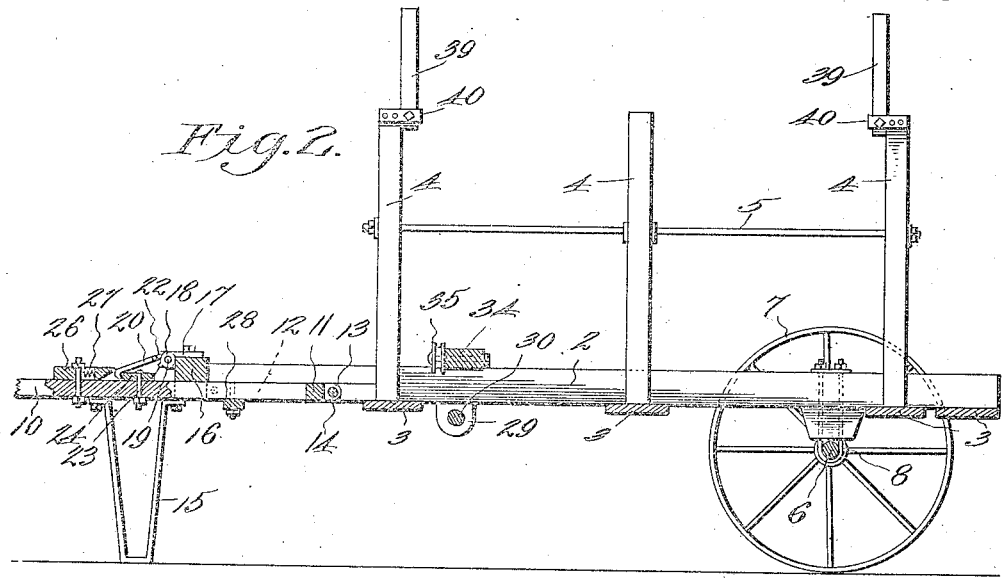
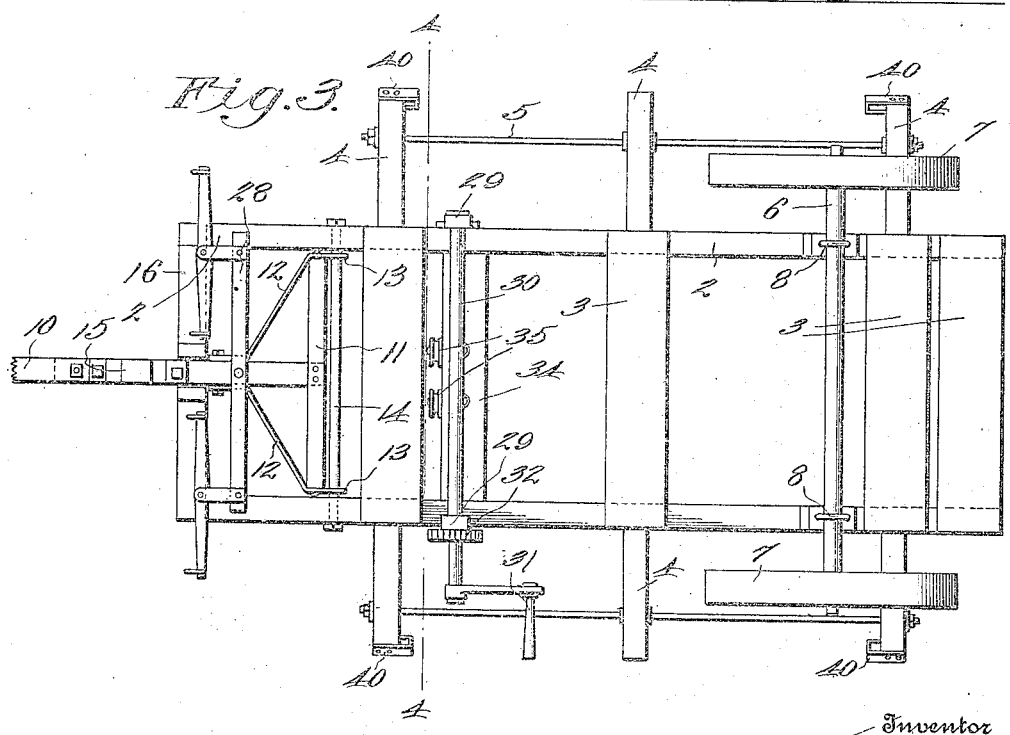

CYRIL MASSEY, OF BRIDGETON, NEW JERSEY.

STALK-CART.

1,262,538.  Specification of Letters Patent.  Patented Apr. 9, 1918.

Application filed December 29, 1916. Serial No. 139,614.

*To all whom it may concern:*

Be it known that I, CYRIL MASSEY, a citizen of the United States, residing at Bridgeton, in the county of Cumberland and State of New Jersey, have invented new and useful Improvements in Stalk-Carts, of which the following is a specification.

This invention relates to stalk carts and it has for its primary object to provide a vehicle for facilitating the collection and transportation of corn stalks and the like.

To this end the invention includes among other features an efficient portable stalk cart wherein is embodied novel features of construction for receiving and retaining large quantities of stalks; to provide convenient mechanism for facilitating the operation of placing a shock or bundle of stalks upon the cart, and to employ improved and efficient means for retaining the shock securely in position on the cart.

A further object of the invention is to produce an improved device of the character set forth embodying substantial and practical features of construction whereby the mechanism of the device will be reliable and effective in operation and not likely to become broken or disarranged while in use.

A further object of the invention is to produce an improved stalk cart embodying a wheeled carrying frame, an axle on which said frame is pivotally supported, a tongue pivotally connected with the carrying frame, and a latch device whereby the tongue may be secured in fixed relation to the frame, permitting said frame to be tilted independently of the tongue or without swinging the forward end of the tongue in an upward direction, and also permitting the tongue to be used as a lever to assist in tilting the frame to dumping position.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,

Figure 1 is a side elevation of a stalk cart constructed in accordance with the invention.

Fig. 2 is a longitudinal vertical sectional view of the same.

Fig. 3 is a bottom plan view.

Fig. 4 is a transverse sectional view taken on the line 4—4 in Fig. 3.

Fig. 5 is a perspective detail view of the latch device for locking the tongue with respect to the frame.

Corresponding parts in the several figures are denoted by like characters of reference.

The carrying frame of the improved device embodies in its construction longitudinally extending side members or bars 2 and transversely disposed connecting pieces or cross bars 3. Upwardly diverging stalk retaining or shock retaining frames are connected in any convenient manner with the main frame, each of said retaining frames having been shown as comprising inclined uprights or stakes 4 and a rod 5 whereby said stakes are connected and assembled together. An axle 6 having transporting wheels 7 is fixedly connected with the side bars 2 by means of U-shaped bolts or clips 8, bolster blocks being interposed between the side bars 2 and the axle for the purpose of properly spacing said side bars from the axle.

The wheels 8 are constructed with relatively broad treads in order that the cart may be conveniently operated when the ground is soft and soggy.

The cart is preferably drawn by a span of horses and it is therefore provided with a tongue 10, said tongue having been shown as being provided at the rearward end thereof with a cross bar 11 of a length nearly equal to the distance between the side bars 2 of the frame. Hounds 12 are secured at their forward ends to the sides of the tongue with respect to which said hounds diverge rearwardly, being secured on the ends of the cross bar 11 with respect to which the hounds extend rearwardly to form lugs 13 that are pivoted on a cross bar 14 which connects the side members 2 of the main frame. The end portions of the hounds practically abut on the inner faces of the side members 2, thereby preventing lateral movement of the tongue with respect to the frame. The tongue carries on its under side a leg or supporting member 15 whereby the tongue as well as the cart frame will be supported when stationary, it being understood that the tongue extends beneath the front cross bar 16 of the frame and that the rod 14 with which the tongue is pivotally connected is located to the rearward of the cross bar 16. Fixed on the cross bar 16 is a bracket 17 having lugs 18 which are connected by a pivot member 19 on which a latch 20 having at its forward end a beveled hook 21 is pivotally supported, each lug 18 being provided at its forward corners with stops 22, 23 whereby the swinging movement of the latch hook 19 in an upward and downward direction will be limited. Secured on the tongue 10 for coöperation with the latch hook 20 is a latch block 24 having a beveled face 25 at the forward end thereof to be engaged by the hook 21 when the cart frame and the tongue are to be latched together. A safety device is provided, the same consisting of a spring actuated slide 26 mounted for longitudinal movement on the tongue and adapted by its actuating spring 27 to be held forcibly in engagement with the forward portion of the latch hook when the latter is in engagement with the block 24, thereby preventing accidental disengagement of the parts. The tongue is provided with an evener 28 which may be in the nature of an ordinary double tree to which the draft animals may be attached.

The side members 2 of the main frame are provided with bearing boxes 29 wherein is journaled a drum shaft 30 having at one end a crank 31 whereby it may be rotated, said drum shaft being also provided with a ratchet wheel 32 engaged by a dog or pawl 33 to prevent reverse rotation of the shaft. A cross bar 34 having guide pulleys 35 mounted on a vertical face thereof is fixed on the side members 2 above and in close relation to the drum shaft. Connected with the drum shaft are flexible elements 36 which are adapted to be wound thereon and to be guided over the pulleys 35, extending from thence upwardly and around any shock or accumulation of stalks that may have been placed on the cart, said flexible elements being preferably provided with interengaging fastening members such as a link or eye 37 and a hook 38.

In the operation of this invention a large quantity of loose stalks may be manually placed on the carrying frame between the stalk retaining frames, said stalks being subsequently tied in position by surrounding the same with the flexible elements 36, said elements being tightened by means of the drum shaft 30. The improved cart, however, is particularly designed for picking up or loading, at a single operation, a large and heavy shock, and when thus used the cart is driven up close to the shock and turned until the rearward end of the cart faces the shock. The carrying frame is now unlatched with respect to the tongue and tilted by swinging the forward end thereof in an upward direction, such swinging movement being obviously about the axis of the axle 6. The cart is now backed up close to the shock which latter will be positioned between the retaining frames, after which the free ends of the flexible elements 36 are carried around the shock and connected together by tying, by the interengaging fastening members 37, 38, or in any convenient manner. The drum shaft 30 is now rotated by means of the crank 31, the ends of the flexible elements which are guided over the pulleys 35 being wound on the shaft until the shock is held very securely, reverse rotation of the drum shaft being prevented by the interengaging ratchet 32 and pawl 33. When the cart is now drawn in a forward direction the shock, which still remains standing on the ground, will be tilted by frictional engagement with the surface of the ground, thereby restoring the carrying frame to its initial position where it may be connected with the tongue by the latch device herein described, the tilting operation being of course to some extent assisted by the driver or operator of the cart. The latter may now be drawn to the place of deposit where the unloading operation may be effected by again releasing the latch device and, if necessary, utilizing the tongue as a lever to start the carrying frame toward a discharging position after which the tying device may be released and the shock left standing when the cart is moved away.

When an unusually large quantity of stalks is to be carried, the stakes or uprights of the retaining frames may be provided with extension members 39 slidably connected therewith by means of keepers 40 at the outer or upper ends thereof. When not desired for present use, the extension members 39 may be conveniently retracted and secured in retracted position by any suitable means.

Having thus described the invention, what is claimed as new is:

A stalk cart comprising a bed frame pivotally mounted upon a wheel supported axle, said frame having a front cross bar, a rod carried by the frame at a point behind the cross bar, a tongue pivotally connected with the rod and adapted to extend transversely under the cross bar and in contact with the same, a latch hook pivotally mounted on the cross bar, a block mounted on the tongue and adapted to be engaged by the bill of the hook, and a spring pressed member slidably mounted on the tongue and adapted to engage the hook when the hook is in engagement with the block, whereby the tongue is securely held in a fixed position with relation to the bed frame.

In testimony whereof I affix my signature.

CYRIL MASSEY.